(12) United States Patent
Feng et al.

(10) Patent No.: US 12,124,476 B2
(45) Date of Patent: Oct. 22, 2024

(54) DISTRIBUTED STORAGE OF BLOCKS IN BLOCKCHAINS

(71) Applicant: Nokia Technologies Oy, Espoo (FI)

(72) Inventors: Jingyu Feng, Xi'an (CN); Shaoqing Lv, Shaanxi (CN); Guangyue Lu, Shaanxi (CN)

(73) Assignee: Nokia Technologies Oy, Espoo (FI)

( * ) Notice: Subject to any disclaimer, the term of this patent is extended or adjusted under 35 U.S.C. 154(b) by 255 days.

(21) Appl. No.: 17/604,222

(22) PCT Filed: Apr. 19, 2019

(86) PCT No.: PCT/CN2019/083452
§ 371 (c)(1),
(2) Date: Oct. 15, 2021

(87) PCT Pub. No.: WO2020/211078
PCT Pub. Date: Oct. 22, 2020

(65) Prior Publication Data
US 2022/0215038 A1    Jul. 7, 2022

(51) Int. Cl.
*G06F 16/27* (2019.01)
*G06F 16/23* (2019.01)

(52) U.S. Cl.
CPC .......... *G06F 16/27* (2019.01); *G06F 16/2379* (2019.01)

(58) Field of Classification Search
CPC .. G06F 16/2379; G06F 16/27; G06F 16/9024; G06F 16/02; H04L 67/104; H04L 67/1095; H04L 9/50
See application file for complete search history.

(56) References Cited

U.S. PATENT DOCUMENTS

| | | | | |
|---|---|---|---|---|
| 2018/0019867 A1* | 1/2018 | Davis | .................... | H04L 63/104 |
| 2019/0102409 A1* | 4/2019 | Shi | ......................... | G06F 9/5077 |
| 2020/0021643 A1* | 1/2020 | Purushothaman | .. | H04W 12/009 |

FOREIGN PATENT DOCUMENTS

| | | |
|---|---|---|
| CN | 107122477 A | 9/2017 |
| CN | 108259622 A | 7/2018 |
| CN | 108352014 A | 7/2018 |
| CN | 108769142 A | 11/2018 |
| CN | 109271283 A | 1/2019 |
| CN | 109417483 A | 3/2019 |
| CN | 109559117 A | 4/2019 |
| WO | 2018/112805 A1 | 6/2018 |

OTHER PUBLICATIONS

Extended European Search Report received for corresponding European Patent Application No. 19924983.0, dated Oct. 24, 2022, 9 pages.

(Continued)

*Primary Examiner* — Taelor Kim
(74) *Attorney, Agent, or Firm* — Laine IP Oy (57) ABSTRACT

A method comprises: receiving, by a second node, a new transaction to be recorded to a block in a blockchain (510), determining, by the second node, based on an identity of the block that the second node is one of a subset of block managers in the blockchain to store the block (520), adding the block to the blockchain responsive to the determination (530) and transmitting a block list, wherein the block list comprises information about the block (540).

15 Claims, 6 Drawing Sheets

(56) References Cited

OTHER PUBLICATIONS

Nakamoto, "Bitcoin: A peer-to-peer electronic cash system", Decentralized Business Review, 2008, pp. 1-9.

Swan, "Blockchain: blueprint for a new economy", O'Reilly Media Inc, 2015, 149 pages.

Peters et al., "Trends in Crypto-Currencies and Blockchain Technologies: A Monetary Theory and Regulation Perspective", Journal of Financial Perspectives, vol. 3, No. 3, 2015, pp. 1-43.

Azaria et al., "Medrec: Using blockchain for medical data access and permission management", 2nd International Conference on Open and Big Data (OBD), Aug. 22-24, 2016, pp. 25-30.

Ramachandran et al., "Blockchain for the IoT: Opportunities and Challenges", arXiv, May 8, 2018, 5 pages.

Xu et al., "The blockchain as a software connector", 13th Working IEEE/IFIP Conference on Software Architecture (WICSA), Apr. 5-8, 2016, pp. 182-191.

Hou, "The Application of Blockchain Technology in E-Government in China", 26th International Conference on Computer Communication and Networks (ICCCN), Jul. 31-Aug. 3, 2017, 4 pages.

Grech et al., "Blockchain in Education", JRC, 2017, 136 pages.

Wang et al., "A Survey on Consensus Mechanisms and Mining Management in Blockchain Networks", arXiv, Feb. 19, 2019, 40 pages.

"Distributed Block Storage (something Between a Full Node and a Light Node)", Reddit, Retrieved on Oct. 5, 2021, Webpage available at : https://www.reddit.com/r/BitcoinDiscussion/comments/7lxssa/distributed_block_storage_something_between_a/.

"Partial Bitcoin Nodes", Reddit, Retrieved on Oct. 5, 2021, Webpage available at : https://www.reddit.com/r/Bitcoin/comments/5xb67w/partial_bitcoin_nodes/.

Raman et al., "Dynamic Distributed Storage for Scaling Blockchains", arXiv, Jan. 7, 2018, pp. 1-19.

"Wouldn't bitcoin benefit from distributing partial blockchains over each node?", Bitcoin, Retrieved on Oct. 5, 2021, Webpage available at : https://bitcoin.stackexchange.com/questions/40600/wouldnt-bitcoin-benefit-from-distributing-partial-blockchains-over-each-node.

Pop et al., "Blockchain Based Decentralized Management of Demand Response Programs in Smart Energy Grids", Sensors, vol. 18, No. 1, 2018, pp. 1-21.

Qu et al., "A Hypergraph-Based Blockchain Model and Application in Internet of Things-Enabled Smart Homes", Sensors, vol. 18, No. 9, 2018, pp. 1-18.

International Search Report and Written Opinion received for corresponding Patent Cooperation Treaty Application No. PCT/CN2019/083452, dated Jan. 16, 2020, 10 pages.

Abe, "Blockchain Storage Load Balancing Among DHT Clustered Nodes", arXiv, Master Thesis, Feb. 6, 2019, 74 pages.

\* cited by examiner

DISTRIBUTED STORAGE OF BLOCKS IN BLOCKCHAINS

RELATED APPLICATION

This application was originally filed as PCT Application No. PCT/CN2019/083452, filed on Apr. 19, 2019, of which is incorporated herein by reference in its entirety.

FIELD

The present invention relates to blockchains, and more specifically to distributed storage of blocks in blockchains.

BACKGROUND

Blockchains are exploited in a diverse range of applications already and the usage of blockchains is expected to even increase in the near future. A blockchain may be seen as a public ledger with a chain of blocks, each of which is made up of several committed transactions, and it may grow continuously in chronological order when new blocks are appended to it. The core advantages of blockchains are decentralization, transparency, traceability, and tamper-resistance. Thus, blockchains may be applied in many fields, such as financial services, medicine, Internet of Things, IoT, software engineering, e-government and public services.

Blockchains generally provide a completely auditable log that includes every single transaction ever done in a blockchain network, which is very useful in a number of use cases. However, due to this nature, scalability of blockchains is affected by their ever-growing size. Improved methods, apparatuses and computer programs are therefore needed for exploiting blockchains.

SUMMARY

According to some aspects, there is provided the subject-matter of the independent claims. Some embodiments are defined in the dependent claims.

According to a first aspect, there is provided a first method comprising receiving, by a second node, a new transaction to be recorded to a block in a blockchain, determining, by the second node, based on an identity of the block that the second node is one of a subset of block managers in the blockchain to store the block, adding the block to the blockchain responsive to the determination and transmitting a block list, wherein the block list comprises information about the block.

According to the first aspect, the first method may further comprise receiving, from the first node, a request for a copy of the block and transmitting the copy of the block responsive to the request.

According to a second aspect, there is provided a second method comprising receiving, by a first node, a block list comprising information about a block in a blockchain, determining, by the first node, based on an identity of the block that a second node is one of a subset of block managers in the blockchain storing the block and transmitting, to the second node, a request for a copy of the block.

According to the first or the second aspect, the information about the block may comprise an identity of the block.

According to the first or the second aspect, the information about the block may comprise a total number of nodes at a time when the block was created and/or a number of block managers storing the block.

According to the first or the second aspect, said determining that the second node is one of the subset of block managers may be further based on a total number of nodes at a time when the block was created.

According to the first or the second aspect, said determining that the second node is one of the subset of block managers may be further based on a number of block managers storing the block.

According to the first or the second aspect, said determining that the second node is one of the subset of block managers may be done using a mapping function. In some embodiments, the mapping function may be $N\_ID_i = B\_ID_k \pmod{n_c - n_m} + h$, $1 \leq h \leq n_m$, wherein $N\_ID_i$ may be an identity of an i-th node, $B\_ID_k$ may be the identity of the block, $n_c$ may be a total number of nodes at a time when the block was created and $n_m$ may be a number of block managers storing the block.

According to a third aspect of the present invention, there is provided an apparatus comprising at least one processing core, at least one memory including computer program code, the at least one memory and the computer program code being configured to, with the at least one processing core, cause the apparatus at least to perform the first method.

According to a fourth aspect of the present invention, there is provided an apparatus comprising at least one processing core, at least one memory including computer program code, the at least one memory and the computer program code being configured to, with the at least one processing core, cause the apparatus at least to perform the second method.

According to a fifth aspect of the present invention, there is provided an apparatus comprising means for performing the first method. According to a sixth aspect of the present invention, there is provided an apparatus comprising means for performing the second method.

According to a seventh aspect of the present invention, there is provided non-transitory computer readable medium having stored thereon a set of computer readable instructions that, when executed by at least one processor, cause an apparatus to at least perform the first method.

According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EMBODIMENTS

Usage of blockchains may be improved by the procedures described herein. More specifically, embodiments of the present invention provide procedures for distributed storage of blocks in blockchains. For instance, a subset of block managers, but not all, may store one block. The subset of block managers for the block in question may be identified, or located, based on an identity of the block. Moreover, a total number of nodes at a time when the block was created and/or a number of block managers storing the block may be exploited for identifying, or locating, the subset of block managers as well. In some embodiments of the present invention, a mapping function may be used for this purpose.

Blockchains are increasingly applied for recording transactions without relying to a centralized entity. Changes in resource ownership in a blockchain network take the form of blockchain transactions secured by strong cryptography. Information provided in a blockchain transaction may be stored as a new block in the blockchain in response to validation of the respective blockchain transaction. Blockchain state information shared by the nodes may store all transactions and history carried out in the blockchain network. Application of blockchain technology and a ledger make it possible to track the unique history of transactions by the individual nodes in the network.

The following steps may be performed for creating a new block in a blockchain network. First, a new transaction may be generated and broadcasted to all nodes in the blockchain network. Each node may then collect the new transaction into a block. A consensus mechanism may be exploited for selecting one node and when a node is selected for creating a block using the consensus mechanism, the selected node may create the block and broadcast the created block to all nodes in the blockchain network. Upon receiving the created block, all nodes may accept the created block only if all transactions in the created block are valid and not spent already. All nodes may express, or acknowledge, their acceptance of the created block by working on creating a next block in the blockchain. A hash of the created block that was accepted may be used for the next block.

In some embodiments of the present invention, a blockchain network may comprise lightweight nodes, such as wallets, and full nodes. Lightweight nodes may keep a header of a block only, but not the entire block. A header of a block may comprise for example a hash of a previous block, a time stamp, a nonce and Merkle root. In some embodiments of the present invention, full nodes may be referred to as block managers. That is to say, full nodes may be capable of storing a complete and up-to-date replica of blocks, i.e., a canonical blockchain may be stored locally by full nodes.

For lightweight nodes it may be difficult to verify transactions contained in blocks. For instance, in some blockchain applications, a blockchain may be used as a database for storing data generated by the blockchain network. However, it may be difficult, if not impossible, for lightweight nodes to maintain a distributed database. Full nodes on the other hand may be able to autonomously verify the transactions contained in blocks without external reference. Nevertheless, a hard disk capacity of a full node, i.e., a block manager, may be limited so once a size of all blocks of the blockchain is greater than the hard disk capacity, the full node may not be able to store new blocks. That is to say, in such a case the full node in question may not be able to add new blocks to the blockchain. Development of the blockchain may be therefore limited due to limited hard disk capacity of full nodes.

Some embodiments of the present invention therefore enable storing of blocks in a distributed manner to enable distribution of the load. Thus, embodiments of the present invention provide improvements for various applications to be used in different fields, such as financial services, medicine, Internet of Things, IoT, software engineering, e-government and public services, etc.

Moreover, some embodiments of the present invention provide a mechanism for allocating new blocks amongst the full nodes that store blocks, i.e., block managers. In addition, some embodiments of the present invention provide a mechanism for lightweight nodes, for determining which full nodes have stored a particular block of interest, so that a lightweight node can identify full nodes storing the block and request at least one of the identified full nodes to provide a copy of the block. Therefore, only a subset of block managers may store one block but it is not necessary that all block managers store every block.

So according to some embodiments of the present invention, a distributed block storage scheme may be employed in a blockchain. The distributed block storage scheme may refer to a scheme, wherein a subset of block managers stores a particular block, but not all blocks. The distributed block storage scheme may further employ a block list. The block list may be distributed to all nodes, i.e., each node in the blockchain may have the latest updated version of the block list. The block list may be useful for holding up-to-date information about the entire blockchain and each node may maintain a single-chain structure of the blockchain using the block list. Thus, the block list may be used for looking up blocks of the blockchain rapidly.

Figure 1:
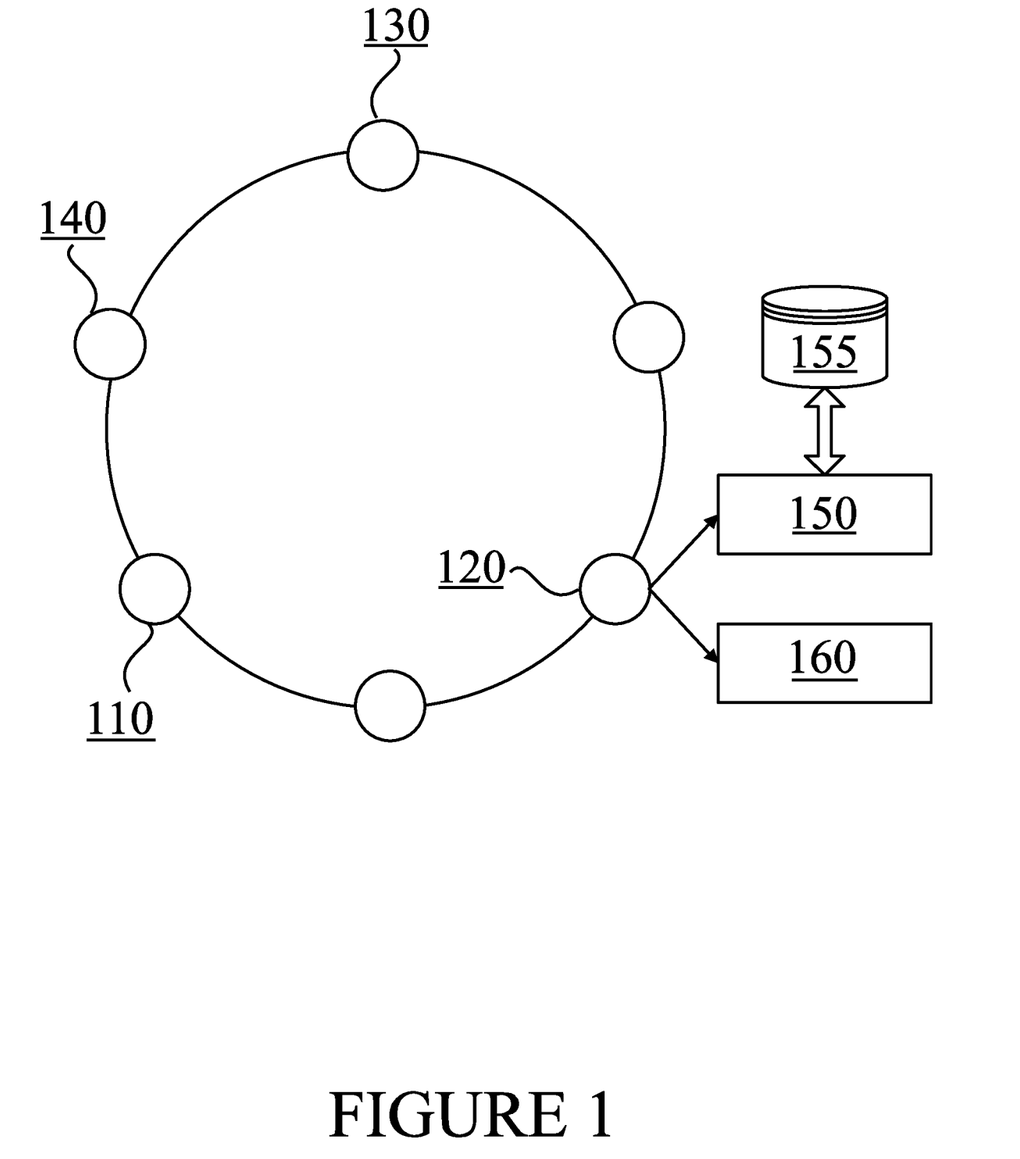
FIG. 1 illustrates an exemplary architecture of a blockchain in accordance with at least some embodiments of the present invention.

FIG. 1 illustrates an exemplary architecture of a blockchain in accordance with at least some embodiments of the present invention. In FIG. 1, a first node of the blockchain is denoted by 110, a second node of the blockchain is denoted by 120, a third node of the blockchain is denoted by 130 and a fourth node of the blockchain is denoted by 140. For instance, first node 110 and third node 130 may be lightweight nodes which do not, or cannot, store blocks of the blockchain while second node 120 and fourth node 140 may be full nodes, i.e., block managers. Thus, second node 120 and fourth node 140 may store blocks of the blockchain. However, it should be noted that in some embodiments of the present invention a fully distributed blockchain network may be achieved if all nodes 110, 120, 130 and 140 are full nodes, i.e., block managers.

In general, nodes 110, 120, 130 and 140 may comprise corporate, authority, and/or user devices, such as a server, a desktop/tablet/laptop computer, smartphone, set-top box or any other suitable electronic device. In addition, a system may comprise an administrator or management node, a hub, relay or other kind of intermediate device for connecting nodes 110, 120, 130 and 140 to further networks or services, such as another distributed or centralized computing system or a cloud service. Nodes 110, 120, 130 and 140 may be mutually addressable in a suitable way, for example, they may communicate using an Internet Protocol, IP. Messages released into an IP network with a recipient address may be routed by the network to the recipient node identified by the recipient address. Other protocols may be used for communication as well so IP is not the only suitable communication protocol that may be used. For example, other peer-to-peer networking models are also suitable.

Second node 120 and fourth node 140 may comprise, or be connected to, block manager 150. Block manager 150 may further comprise, or be connected to, local block database 155. That is to say, for example second node 120 may comprise, or be connected to, local database 155. Moreover, local database 155 may store a block when second node 120 is identified as a block manager for the block in question. In addition, block list is denoted by 160. Block list 160 may be distributed to all nodes of the blockchain, e.g., after adding a new block to the blockchain. Thus, each node of the blockchain has up-to-date information about the entire blockchain. That is to say, all nodes 110, 120, 130 and 140 may have block list 160, or at least have access to block list 160.

Figure 2:
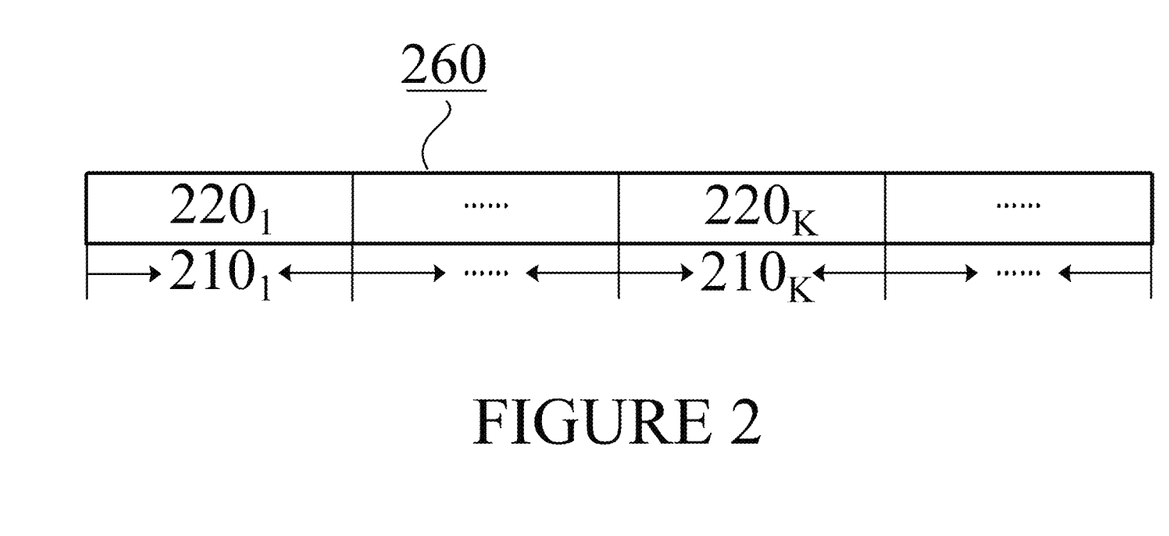
FIG. 2 illustrates an example of a block list in accordance with at least some embodiments of the present invention.

FIG. 2 illustrates an example of a block list in accordance with at least some embodiments of the present invention. Block list 260 of FIG. 2 may correspond to block list 160 of FIGURE. Block list 260 may comprise information, i.e., parameters, related to blocks but not the entire blocks. For instance, block list 260 may comprise first block header $220_1$. First block header $220_1$ may be associated with first block $210_1$, i.e., first block header $220_1$ may be a header of first block $210_1$. Block list 260 may also comprise more block headers, e.g., k-th block header $220_K$. Block header $220_K$ may be associated with k-th block $210_K$, i.e., k-th block header $220_K$ may be a header of k-th block $210_K$.

Block headers may comprise information about blocks of a blockchain. Thus, block list 260 may comprise information about the blocks of the blockchain as well. For example, k-th block header $220_K$ may comprise an identity of block K. The identity of block K may be numbered by creation order, i.e., an identity of new block that is added after block K may be K+1. In addition, or alternatively, k-th block header $220_K$ may comprise a total number of nodes at a time when block K was created and/or a number of block managers, such as second node 120 and fourth node 140, storing block K.

When a new block is added to the blockchain, the information about the new block may be added to a header of the new block and block list 260 may be updated by adding the header of the new block to block list 260. Updated block list may then be distributed to all nodes in the blockchain. Block list 260 may be hence helpful for maintaining a single-channel structure of the blockchain, thereby enabling decentralization, transparency, traceability, and tamper-resistance.

In some cases all nodes of the blockchain may not be able to store all blocks of the blockchain, e.g., due to limited hard disk capacity. Hence, in some embodiments of the present invention, a block manager, such as second node 120, may become a block manager of certain blocks, but not all.

In some embodiments of the present invention, a subset of block managers for block K may be identified, or located, using a unique identity of block K. That is to say, the subset of block managers for block K may be identified, or located, based on the identity of block K. In addition, the subset of block managers for block K may be identified, or located, based on a total number of nodes at a time when block K is created and/or a number of block managers storing block K. The number of block managers storing block K may correspond to a size of the subset of block managers storing block K.

For instance, an exemplary mapping function may be exploited. In some embodiments of the present invention, the exemplary mapping function may be defined as follows.

Taking block K as an example, the subset of block managers storing block K may be identified, or located, using the exemplary mapping function $$N\_ID_i = B\_ID_k (\text{mod } n_c - n_m) + h, 1 \leq h \leq n_m \quad (1)$$

, wherein $N\_ID_i$ is an identity of an i-th node participating in the blockchain, $B\_ID_k$ is the identity of block K, $n_c$ is a total number of nodes at a time when block K was created and $n_m$ is a number of block managers storing block K. The identity of the i-th node participating in the blockchain, $N\_ID_i$, may denote a running number of the i-th node among all nodes participating in the blockchain.

The exemplary mapping function provides various benefits. For example, regardless of how big $B\_ID_k$, the exemplary mapping function ensures that $N\_ID_i \leq n_c - n_m$, i.e., the identity of located, or identified, block managers always falls within a range of nodes.

Moreover, the exemplary mapping function makes it possible for all block managers of block K to have different identities. As $B\_ID_k$ (mod $n_c - n_m$) is a unique value, there are different $N\_ID_i$ values for the number of block managers storing block, $n_m$, and the subset of block managers can be located, or identified, by adjusting h from 1 to $n_m$. For instance, if we assume that $B\_ID_k = 1650$, $n_c = 60$ and $n_m = 8$, then the exemplary mapping function gives a subset $N\_ID_i = \{N_{39}, N_{40}, N_{41}, N_{42}, N_{43}, N_{44}, N_{45}, N_{46}\}$ as a result for locations, or identities, of the block managers of block K.

In addition, the exemplary mapping function makes it possible for all nodes of the blockchain to quickly locate, or identify, the subset of block managers for a certain block, such as block K, thereby saving resources as the nodes do not need to store the identities of these block managers.

Figure 3:
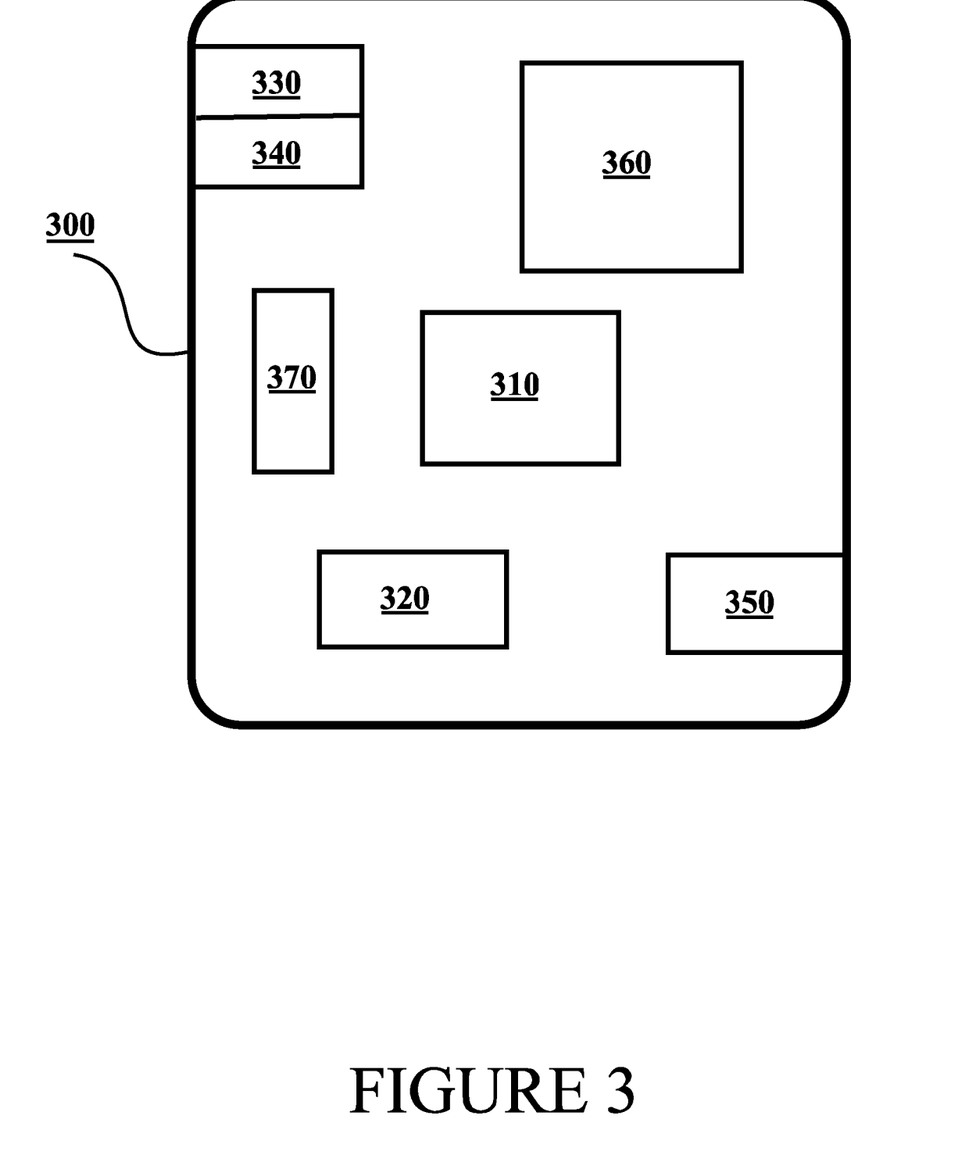
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, first node 110 or second node 120 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c)

hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
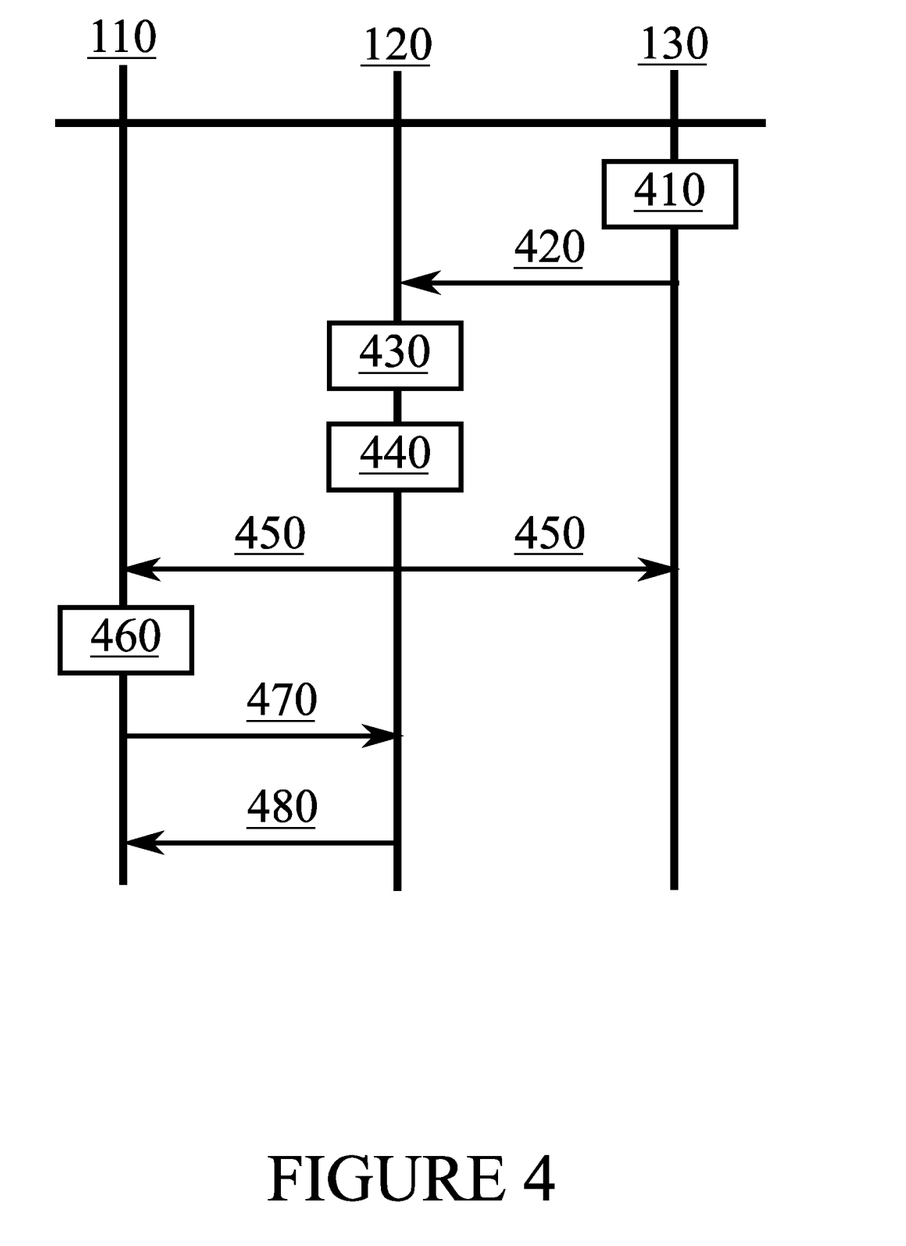
FIG. 4 illustrates an exemplary process in accordance with at least some embodiments of the present invention.

FIG. 4 illustrates an exemplary process in accordance with at least some embodiments of the present invention. On the vertical axes are disposed, from the left to the right, first node 110, second node 120 and third node 130 of FIG. 1. First node 110, second node 120 and third node 130 may be participants in a blockchain. Time advances from the top toward the bottom.

At the start of the exemplary process, at step 410, third node 130 may determine that there is a new transaction to be recorded to the blockchain. At step 420, third node 130 may transmit information about the new transaction to the blockchain and consequently second node 120 may receive the information about the new transaction. Naturally any other node participating in the blockchain, such as first node 110 or second node 120, may perform steps 410 and 420 as well.

Responsive to receiving the information about the new transaction to be recorded to a block in the blockchain, second node 120 may at step 430 determine, based on an identity of the block, that second node 120 is one of a subset of block managers in the blockchain to store the block. The subset of block managers may comprise all block managers of the blockchain that store the block. So for example fourth node 140 of FIG. 1 (not shown in FIG. 4) may also perform step 430, if it is one of the subset of block managers that may store the block.

In some embodiments of the present invention, said determination at step 430 may also comprise determining that second node 120 is one of the subset of block managers based on a total number of nodes at a time when the block was created. Alternatively, or in addition, said determining that the second node is one of the subset of block managers may be further based on a number of block managers storing the block. For instance, said determination at step 430 may comprise determining that the second node is one of the subset of block managers using a mapping function. In some embodiments of the present invention, the mapping function in accordance with Equation (1) may be used.

In some embodiments of the present invention, the total number of nodes at a time when block K was created, denoted by $n_c$, may be recorded in the blockchain, or in a header of a block, and hence second node 120 may retrieve $n_c$. For instance, when a new block is created, $n_c$ can be found from the previous block, or from a header of the previous block, that has just been created. As there is no central authority, a new node joining the network may broadcast a message to the entire network to inform other nodes that the new node has joined, or is about to join, the network. Thus, in some embodiments of the present invention, the total number of nodes at a time when block K was created, $n_c$, may be determined from the last $n_c$, i.e., from the previous block, or a header of the previous block, that has just been created, and the number of nodes that have joined after the creation of the previous block.

Moreover, in some embodiments of the present invention, the number of block managers storing block K, $n_m$, may be predefined, e.g., based on the total number of nodes, $n_c$. For instance, the number of block managers storing block K, $n_m$, may be set as as 10% of the total number of nodes $n_c$.

If second node 120 determines at step 430 that it belongs to the subset of block managers in the blockchain that should store the block in question and second node 120 is selected for creating the block using a consensus mechanism, second node 120 may create a new block comprising the new transaction.

At step 440, second node 120 may store, i.e., add, the new block to the blockchain in response to the determination. The updated blockchain comprising the new block may be stored to local block database 155 for example. At step 440, second node 120 may also add information about the new block to a block list, such as block list 160/260. In some embodiments, block list 160/260 may be stored in local block database 155 as well.

In some embodiments, the information about the new block may comprise an identity of the new block. Moreover, in some embodiments, the information about the new block may comprise a total number of nodes at a time when the new block was created and/or a number of block managers storing the new block, i.e., a size of the subset of the block managers.

At step 450, second node 120 may transmit the block list, the block list comprising information about the new block, to the blockchain. Thus, at step 450 first node 110 and third node 130 may receive the block list that has been updated by second node 120.

At some point after step 450, first node 110 may determine that it would like to have a copy of the new block that was created by second node 120. First node 110 may be a lightweight node and hence it may not have the entire blockchain, i.e., it may not have information about the new block but it may have the block list, provided by second node 120. Alternatively, first node 110 may be a full node, i.e., a block manager, but it may not belong to the subset of block managers that have stored the block.

Thus, first node 110 may determine at step 460, based on an identity of the new block, that second node 120 is one of the subset of block managers in the blockchain storing the new block. The subset of block managers may comprise all block managers of the blockchain that store the block. That is to say, said determination at step 460 may be based on the block list received at step 450.

In some embodiments of the present invention, said determination at step 460 may also comprise determining that second node 120 is one of the subset of block managers based on a total number of nodes at a time when the new block was created. Alternatively, or in addition, said determining that the second node is one of the subset of block managers may be further based on a number of block managers storing the new block, i.e., a size of the subset of the block managers.

For instance, said determination at step 460 may comprise determining that second node 120 is one of the subset of block managers using a mapping function. In some embodiments of the present invention, the mapping function in accordance with Equation (1) may be used.

Upon determining that second node 120 is one of the subset of block managers storing the new block, first node 110 may at step 470 transmit a request for a copy of the new block. Consequently, second node 120 may receive the request at step 470 and responsive to the request, transmit the copy of the new block to first node 110 at step 480. First node 110 may thus receive the copy of the new block at step 480, thereby ending the exemplary process of FIG. 4.

Figure 5:
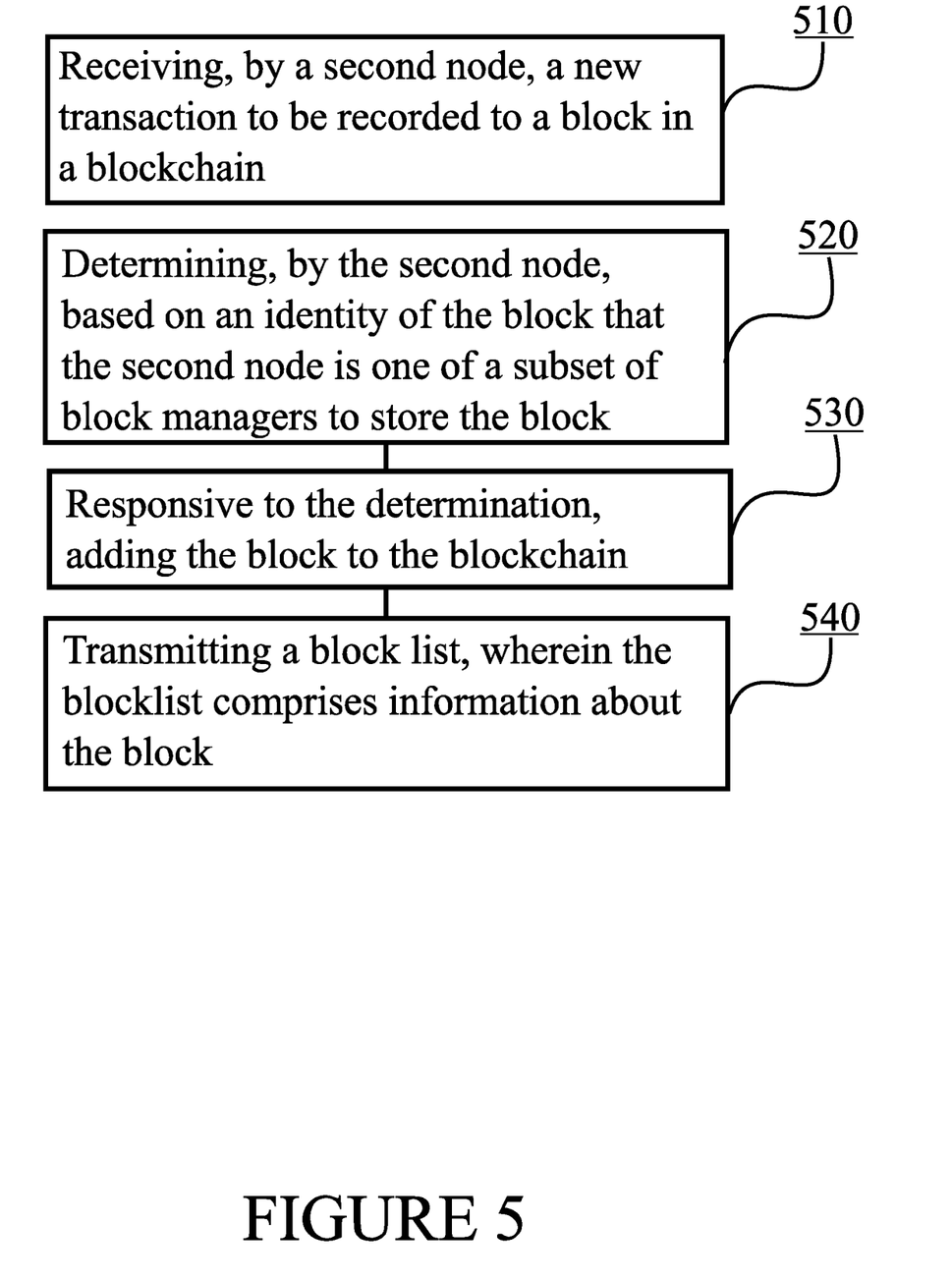
FIG. 5 illustrates a flow graph of a first method in accordance with at least some embodiments of the present invention.

FIG. 5 illustrates a flow graph of a first method in accordance with at least some embodiments. The phases of the illustrated first method may be performed by second node 120, or by a control device configured to control the functioning thereof, possibly when installed therein.

The first method may comprise, at step 510, receiving, by second node 120, a new transaction to be recorded to a block in a blockchain. The first method may also comprise, at step 520, determining, by second node 120, based on an identity of the block that second node 120 is one of a subset of block managers in the blockchain to store the block. Moreover, the first method may comprise, at step 530, adding the block to the blockchain responsive to the determination. Finally, the first method may comprise, at step 540, transmitting a block list, wherein the block list comprises information about the block.

Figure 6:
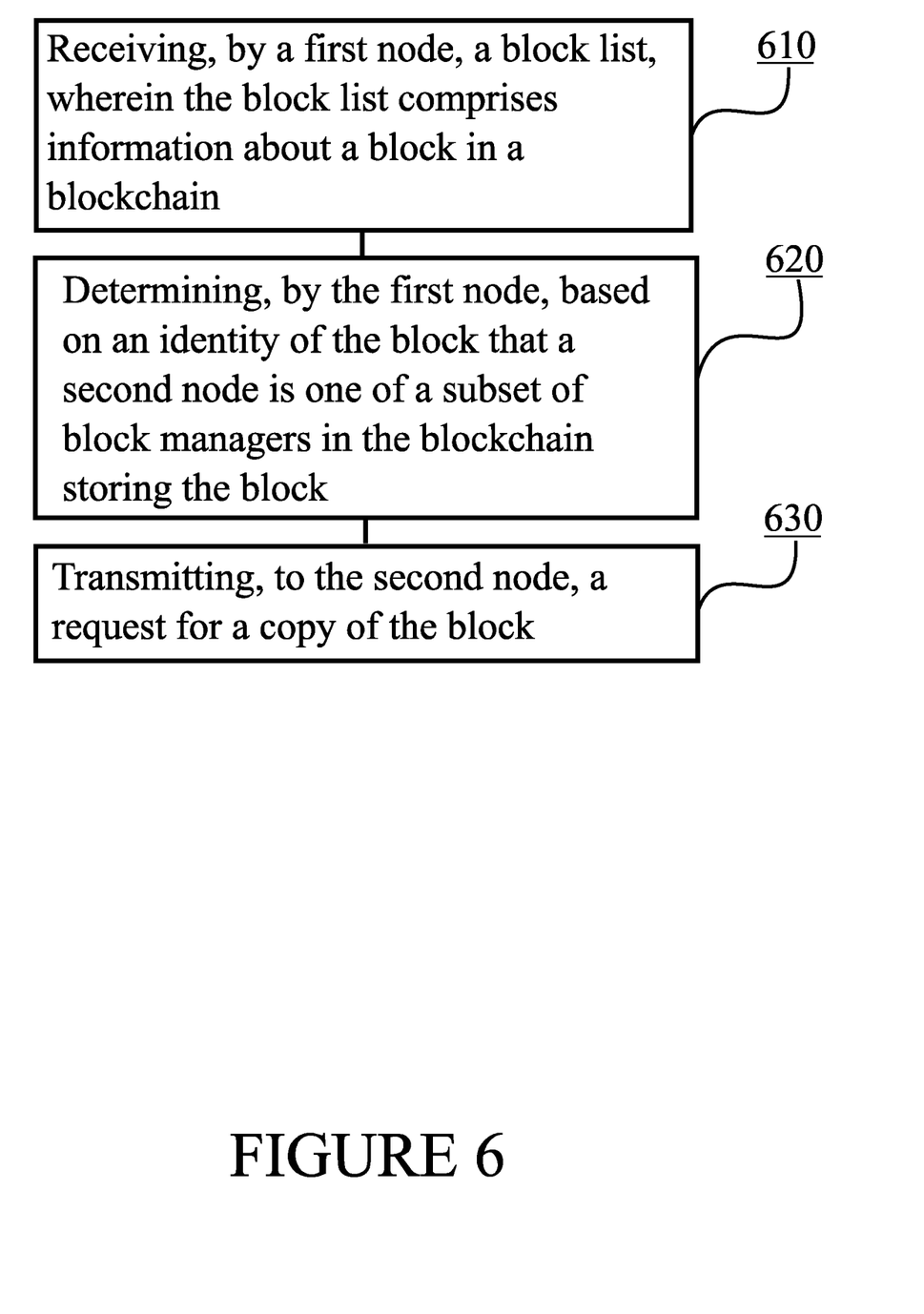
FIG. 6 illustrates a flow graph of a second method in accordance with at least some embodiments of the present invention.

FIG. 6 illustrates a flow graph of a second method in accordance with at least some embodiments. The phases of the illustrated second method may be performed by first node 110, or by a control device configured to control the functioning thereof, possibly when installed therein.

The second method may comprise, at step 610, receiving, by first node 110, a block list, wherein the block list comprises information about a block in a blockchain. The second method may also comprise, at step 620, determining, by first node 110, based on an identity of the block that second node 120 is one of a subset of block managers in the blockchain storing the block. Finally, the second method may comprise, at step 630, transmitting, to second node 120, a request for a copy of the block.

It is to be understood that the example embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment of the present invention. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and example of the present invention may be referred to herein along with alternatives for the various components thereof. It is understood that such example embodiments, examples, and alternatives are not to be construed as de facto equivalents of one another, but are to be considered as separate and autonomous representations of the present invention.

In an exemplary example embodiment, an apparatus, such as, for example, first node 110 or second node 120, may comprise means for carrying out the example embodiments described above and any combination thereof.

In an exemplary example embodiment, a computer program may be configured to cause a method in accordance with the example embodiments described above and any combination thereof. In an exemplary example embodiment, a computer program product, embodied on a non-transitory computer readable medium, may be configured to control a processor to perform a process comprising the example embodiments described above and any combination thereof.

In an exemplary example embodiment, an apparatus, such as, for example, first node 110 or second node 120, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments of the present invention find industrial application in blockchain applications, wherein it is desirable to enable distributed storage of blocks.

ACRONYMS LIST

ASIC Application-specific integrated circuit
FPGA Field-programmable gate array
GSM Global system for mobile communication
IC Integrated Circuit
IP Internet Protocol
IoT Internet of Things
LTE Long term evolution
M2M Machine to machine
NFC Near-field communication
UI User interface
WCDMA Wideband code division multiple access
WLAN Wireless local area network

REFERENCE SIGNS LIST

| 110, 120, 130, 140 | Nodes |
| 150 | Block manager |
| 155 | Local block database |
| 160, 260 | Block list |
| 115, 125, 135 | Interfaces |
| 210 | Block |
| 220 | Header of a block |
| 300-370 | Structure of the apparatus of FIG. 3 |
| 410-480 | Phases of the exemplary process in FIG. 4 |
| 510-540 | Steps of the first method in FIG. 5 |
| 610-630 | Steps of the second method in FIG. 6 |

What is claimed is:

1. A method, comprising:
receiving, by a second node of a blockchain, a new transaction to be recorded to a block in the blockchain;
determining, by the second node, based on an identity of the block that the second node is one of a subset of block managers in the blockchain enabled to store the block;
responsive to the determination, adding the block to the blockchain;
following the adding of the block to the blockchain, updating, by the second node, a block list with information about the block, wherein the updated block list comprises information about all blocks of the blockchain, but not entire blocks, to enable rapid looking up of blocks of the blockchain, the information about the block comprising the identity of the block, a total number of nodes at a time when the block was created and a number of block managers storing the block; and transmitting, by the second node, the updated block list to other nodes of the blockchain comprising at least a first node, wherein the first node is a lightweight or full node not storing the block.

2. A method according to claim 1, further comprising:

receiving, from the first node, a request for a copy of the block; and transmitting the copy of the block responsive to the request.

3. A method according to claim 1, wherein said determining that the second node is one of the subset of block managers is further based on a total number of nodes at a time when the block was created.

4. A method according to claim 1, wherein said determining that the second node is one of the subset of block managers is further based on a number of block managers storing the block.

5. A method according to claim 1, wherein said determining that the second node is one of the subset of block managers is done using a mapping function.

6. A method according to claim 5, wherein the mapping function is $$N_{ID_i} = B_{ID_k} (\mathrm{mod}\ n_c - n_m) + h, 1 \leq h \leq n_m$$

wherein $N_{ID_i}$ is an identity of an i-th node, $B_{ID_k}$ is the identity of the block K, $n_c$ is the total number of nodes at a time when the block was created and $n_m$ is the number of block managers storing the block.

7. An apparatus comprising at least one processing core, at least one memory including computer program code, the at least one memory and the computer program code being configured to, with the at least one processing core, cause the apparatus at least to perform:

receiving, by a second node of a blockchain, a new transaction to be recorded to a block in the blockchain;

determining, by the second node, based on an identity of the block that the second node is one of a subset of block managers in the blockchain enabled to store the block;

add the block to the blockchain responsive to the determination;

following the adding of the block to the blockchain, updating, by the second node, a block list with information about the block, wherein the updated block list comprises information about all blocks of the blockchain, but not entire blocks, to enable rapid looking up of blocks of the blockchain, the information about the block comprising the identity of the block, a total number of nodes at a time when the block was created and a number of block managers storing the block; and transmitting, by the second node, a block list to other nodes of the blockchain comprising at least a first node, wherein the first node is a lightweight or full node not storing the block.

8. An apparatus according to claim 7, wherein the at least one memory and the computer program code are further being configured to, with the at least one processing core, cause the apparatus at least to perform:

receive, from the first node, a request for a copy of the block; and transmit the copy of the block responsive to the request.

9. An apparatus according to claim 7, wherein said determining that the second node is one of the subset of block managers is further based on a total number of nodes at a time when the block was created.

10. An apparatus according to claim 7, wherein said determining that the second node is one of the subset of block managers is further based on a number of block managers storing the block.

11. An apparatus according to claim 7, wherein said determining that the second node is one of the subset of block managers is done using a mapping function.

12. An apparatus according to claim 11, wherein the mapping function is $$N_{ID_i} = B_{ID_k} (\mathrm{mod}\ n_c - n_m) + h, 1 \leq h \leq n_m$$

wherein $N_{ID_i}$ is an identity of an i-th node, $B_{ID_k}$ is the identity of the block K, $n_c$ is the total number of nodes at the time when the block was created and $n_m$ is the number of block managers storing the block.

13. A non-transitory computer readable medium having stored thereon a set of computer readable instructions that, when executed by at least one processor, cause an apparatus to at least perform:

receiving, by a second node of a blockchain, a new transaction to be recorded to a block in the blockchain;

determining, by the second node, based on an identity of the block that the second node is one of a subset of block managers in the blockchain enabled to store the block;

responsive to the determination, adding the block to the blockchain;

following the adding of the block to the blockchain, updating, by the second node, a block list with information about the block, wherein the updated block list comprises information about all blocks of the blockchain, but not entire blocks, to enable rapid looking up of blocks of the blockchain, the information about the block comprising the identity of the block, a total number of nodes at a time when the block was created and a number of block managers storing the block; and transmitting, by the second node, a block list to other nodes of the blockchain comprising at least a first node, wherein the first node is a lightweight or full node not storing the block.

14. A method according to claim 1, wherein the information about all the blocks of the blockchain comprises, for each block of the blockchain, an identity of a given block, a total number of nodes at a time when the given block was created and a number of block managers storing the given block.

15. An apparatus according to claim 7, wherein the information about all the blocks of the blockchain comprises, for each block of the blockchain, an identity of a given block, a total number of nodes at a time when the given block was created and a number of block managers storing the given block.

* * * * *